(12) United States Patent
Van Der Ham et al.

(10) Patent No.: US 9,849,893 B2
(45) Date of Patent: Dec. 26, 2017

(54) HUB UNIT

(71) Applicant: AKTIEBOLAGET SKF, Göteborg (SE)

(72) Inventors: Andreas Clemens Van Der Ham, Utrecht (NL); Mairi Joan Torrie, Edinburgh Lothian (GB); Andrew Campbell, East Kilbride (GB); Gerard McGoogan, Philipston (GB)

(73) Assignee: AKTIEBOLAGET SKF, Gothenburg (SE)

( * ) Notice: Subject to any disclaimer, the term of this patent is extended or adjusted under 35 U.S.C. 154(b) by 3 days.

(21) Appl. No.: 14/779,669

(22) PCT Filed: Mar. 27, 2013

(86) PCT No.: PCT/EP2013/056474
§ 371 (c)(1),
(2) Date: Sep. 24, 2015

(87) PCT Pub. No.: WO2014/154259
PCT Pub. Date: Oct. 2, 2014

(65) Prior Publication Data
US 2016/0039434 A1 Feb. 11, 2016

(51) Int. Cl.
*B61F 15/26* (2006.01)
*B61F 15/12* (2006.01)
*F16C 25/06* (2006.01)
*F16C 19/38* (2006.01)
*F16C 19/52* (2006.01)
(Continued)

(52) U.S. Cl.
CPC .............. *B61F 15/26* (2013.01); *B61F 15/12* (2013.01); *B61F 15/20* (2013.01); *F16C 19/386* (2013.01); *F16C 19/525* (2013.01); *F16C 19/527* (2013.01); *F16C 25/06* (2013.01); *F16C 35/063* (2013.01); *F16C 2326/10* (2013.01)

(58) Field of Classification Search
CPC .... F16C 19/386; F16C 19/525; F16C 19/527; F16C 25/06; F16C 35/063; F16C 41/007; B60B 27/001; B61F 15/12; B61F 15/20; B61F 15/26; B61K 9/04; G01P 3/443; B21B 38/008; G08C 17/02; G91M 13/045; G01M 13/045; G01M 7/02; G01M 15/12
USPC ............... 384/448, 548, 586, 589, 551, 563; 301/108.1, 105.1; 340/682; 324/166; 73/636
See application file for complete search history.

(56) References Cited

U.S. PATENT DOCUMENTS 3,718,040 A * 2/1973 Freeman ................. G01L 5/161
73/146
3,878,719 A * 4/1975 Luttmann ............. B02C 15/004
184/108
(Continued)

FOREIGN PATENT DOCUMENTS

DE 102006035703 A1 * 2/2008 ............. B61D 43/00
EP 0288155 A2 * 10/1988 ............... B61K 9/06
(Continued)

*Primary Examiner* — Marcus Charles
(74) *Attorney, Agent, or Firm* — Bryan Peckjian; SKF USA Inc. Patent Dept.

(57) ABSTRACT

A hub unit including an end cap for preloading and retaining a bearing unit on an axle. The end cap is provided with a sensor unit for detecting at least one of vibrations and temperature of the bearing unit.

18 Claims, 5 Drawing Sheets

(51) Int. Cl.
 _B61F 15/20_  (2006.01)
 *F16C 35/063*  (2006.01)

(56) References Cited

U.S. PATENT DOCUMENTS

| | | | | |
|---|---|---|---|---|
| 4,119,284 | A * | 10/1978 | Belmont | B61K 9/04 116/DIG. 38 |
| 4,812,826 | A * | 3/1989 | Kaufman | B61K 9/06 246/169 A |
| 5,438,322 | A * | 8/1995 | Martin | F16C 19/525 246/169 A |
| 6,695,483 | B2 * | 2/2004 | Sakatani | B61F 15/20 384/448 |
| 7,241,053 | B2 * | 7/2007 | Sato | D21G 1/0226 374/E13.01 |
| 8,757,000 | B2 * | 6/2014 | Graf | B61K 9/04 73/593 |
| 2003/0030565 | A1 * | 2/2003 | Sakatani | G01H 1/003 340/679 |
| 2004/0105602 | A1 * | 6/2004 | Mizutani | F16C 33/78 384/448 |
| 2005/0258950 | A1 * | 11/2005 | Sahashi | B60C 23/041 340/444 |
| 2006/0107765 | A1 * | 5/2006 | Sentoku | G01L 5/0009 73/862.322 |
| 2007/0030162 | A1 * | 2/2007 | Okada | F16C 19/52 340/682 |
| 2009/0255341 | A1 * | 10/2009 | Zimmerman | G01N 29/043 73/588 |
| 2012/0323439 | A1 * | 12/2012 | Inakazu | B60Q 5/008 701/36 |
| 2013/0031043 | A1 * | 1/2013 | Nagathil | G06N 7/023 706/47 |
| 2013/0049448 | A1 * | 2/2013 | Kitamura | B60B 27/0068 301/110.5 |
| 2013/0145885 | A1 * | 6/2013 | Kitamura | B62M 25/08 74/473.12 |

FOREIGN PATENT DOCUMENTS

| | | | | |
|---|---|---|---|---|
| EP | 1211500 | A1 | 6/2002 | |
| EP | 1241067 | A2 * | 9/2002 | B60T 8/171 |
| FR | 2925676 | A1 | 6/2009 | |
| JP | 62169034 | A * | 7/1987 | G01M 13/04 |
| JP | 04359156 | A * | 12/1992 | |
| JP | 3194907 | B2 * | 8/2001 | |
| JP | 3194907 | B2 * | 8/2001 | F16C 33/7886 |
| JP | 2001324416 | A * | 11/2001 | |
| JP | 2003090335 | A | 3/2003 | |
| JP | 2003090336 | A * | 3/2003 | |
| JP | 2004132477 | A * | 4/2004 | |
| JP | 2008051819 | A | 3/2008 | |
| JP | 2013019874 | A * | 1/2013 | |
| JP | 5178594 | B2 * | 4/2013 | G01M 13/04 |
| SU | 720335 | A * | 3/1980 | G01M 13/14 |
| WO | 00051869 | A1 | 9/2000 | |
| WO | WO-2008080211 | A1 * | 7/2008 | G01D 5/3473 |
| WO | WO 2011107107 | A1 * | 9/2011 | F16C 19/522 |
| WO | 2011135198 | A2 | 11/2011 | |
| WO | 2012120244 | A1 | 9/2012 | |

\* cited by examiner

HUB UNIT

CROSS REFERENCE TO RELATED APPLICATION

This is a United States National Stage Application claiming the benefit of International Application Number PCT/EP2013/056474 filed on 27 Mar. 2013 (27.03.2013), which is incorporated herein by reference in its entirety.

FIELD OF THE INVENTION

The invention relates to a hub unit including an end cap for preloading and retaining a bearing unit on an axle. Hub units of this kind are in particular used for railway train hubs, which include in particular two-row tapered roller bearings suitable for heavy loads.

BACKGROUND OF THE INVENTION

Hub units for bearings with tapered raceways for rollers suitable for heavy loads are provided with one or two inner rings fitted onto an axle and outer rings mounted in the hub of the wheel. The inner rings have to be retained and preloaded so as to support the axial forces resulting from the inclinations of the raceways.

It is known to provide retaining end caps at the end of the axle, wherein the retaining end caps are fixed by means of three or four screws for preloading and retaining the bearing unit on the axle.

Retaining end caps in hub units of this type have to act as springs and thus allow for a predetermined flexibility in the axial direction. The strength and material properties, in particular the elastic properties of the ring are therefore highly relevant for the product as a whole and are extensively studied in advance using finite-element analysis algorithms. This problem has led to the technical prejudice that the end cap should be constituted by one massive single body made of strong and flexible steel and that protuberances or recesses should be avoided as far as possible.

Further, it is known to provide bearings other than the above tapered roller bearings with sensor units attached to the outer or inner ring. Typical sensor units are formed as temperature sensors, rotation sensor or vibration sensors suitable for detecting an operating status of the bearing, which may help to detect problems or wear at a very early stage.

Hitherto, sensor units as described above have not been used in railway hubs because it was considered impossible to integrate the sensor in such a way that the resulting assembly is sufficiently robust for operating the harsh conditions e.g. under freight trains.

A further difficulty is the provision of a sufficiently robust power supply for the sensor unit and a reliable possibility for reading out data.

SUMMARY OF THE INVENTION

It is the object of the invention to solve the above problems of the prior art by providing a hub unit including an end cap with a sensor unit for detecting operating parameters of the bearing unit.

The invention starts from a hub unit including an end cap for preloading and retaining a bearing unit on an axle. In particular, the invention relates to train hubs for any kind of railway train, in particular for freight trains. The typical diameter of the end cap required for the invention is 180 mm-200 mm, wherein the latter values are minimum sizes. The invention is applicable for both G-Class and K-Class hubs. Typical preload forces are 445000 N on K class.

It is proposed that the end cap is provided with a sensor unit for detecting at least vibrations and/or temperature of the bearing unit. By providing the sensor unit on or in the end cap rather than on the outer or inner ring of the bearing, it is possible to create an assembly which is sufficiently robust to meet the requirements of the technical field in terms of temperature resistance, robustness, chemical resistance, etc.

In a preferable embodiment, the sensor unit is provided with a wireless transmitter for sending the data acquired by the sensor to a remote receiver unit, which may in particular be installed in the train and connected to a controller of the train. The controller may be configured to evaluate the data received from the sensor unit and to generate warning signal if e.g. a high temperature or strong vibrations indicate that the end of the lifetime of the bearing is approaching.

In a preferred embodiment of the invention, the end cap is provided with a pocket accommodating the sensor unit, wherein the pocket is covered by at least one cover plate.

The sensor unit may be protected from damaging influences from the outside such as gravel, oil, salt, etc. by being safely accommodated within the pocket.

Further, it is proposed that the pocket is formed as an annular recess arranged concentrically with respect to a rotation axis of the bearing unit, which corresponds to a symmetry axis of the end cap or of a central hole thereof.

In this case, the cover plate is preferably provided with a through-hole, wherein at least an antenna portion of the transmitter unit protrudes through the through-hole over the outer surface cover plate. As a consequence, the cover plate may be made of robust metal, in particular of anodized carbon steel, while at the same time the cover plate does not screen the radio transmission signals to and from the antenna portion of the transmitter unit.

In a preferred embodiment of the invention, the sensor unit is provided with an arc-shaped sealed housing and with a circuit board arranged within the housing. The arc-shape is particularly suitable for being fitted into the end cap in proximity to an outer circumference thereof such that the hub package size may be kept while at the same time ensuring a sufficient strength of the hub.

In order to enable a fitting of the circuit board into the arc-shaped housing, it is proposed that the circuit board comprises multiple parts, the parts being pivotably connected by flexible elements to one another. In a preferred embodiment, a wiring side of at least one of the multiple parts is oriented in a direction essentially opposite to the direction in which the wiring side of at least one of the neighboring parts of the circuit board is oriented. The flexible elements may be used to switch the wiring sides of the circuit board. This helps to fit the assembly into the curved interior of the housing.

In preferred embodiments of the invention, the sensor unit may comprise at least one acoustic emission (AE) sensor, a temperature sensor and a gyro sensor.

A further aspect of the invention relates to a controller suitable for reading out data acquired by the sensor unit of a hub unit according to the above defined type, wherein the controller is configured to generate a status information and/or warning signals based on the detection results obtained from the sensor unit.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

BRIEF DESCRIPTION OF THE FIGURES

The invention will now be described in more detail for explanatory, and in no sense limiting, purposes, with reference to the following figures, in which.

DETAILED DESCRIPTION OF THE EMBODIMENTS

Figure 1:
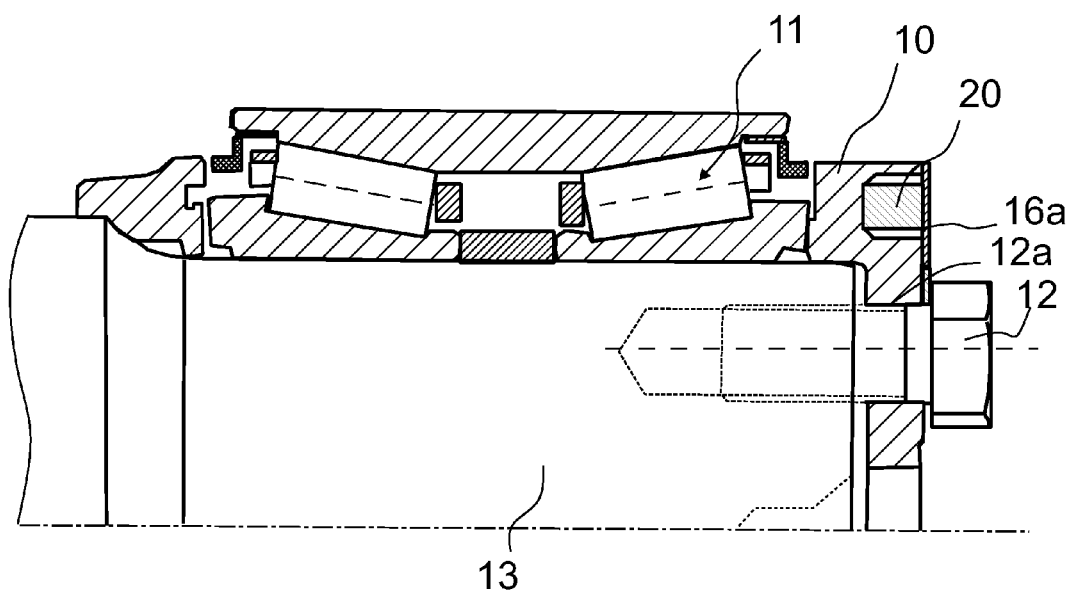
FIG. 1 is a schematic cross-sectional view of a hub unit with an end cap and a two-row taper roller bearing.

FIG. 1 shows a hub unit including an end cap 10 fixed with three bolts 12 on an axial end face of an axle 13 so as to preload and retain a bearing unit 11 with a split inner ring and an outer ring fitted onto the axle 13. The bearing unit 11 is a two-row taper roller bearing in O-configuration.

Figure 3:
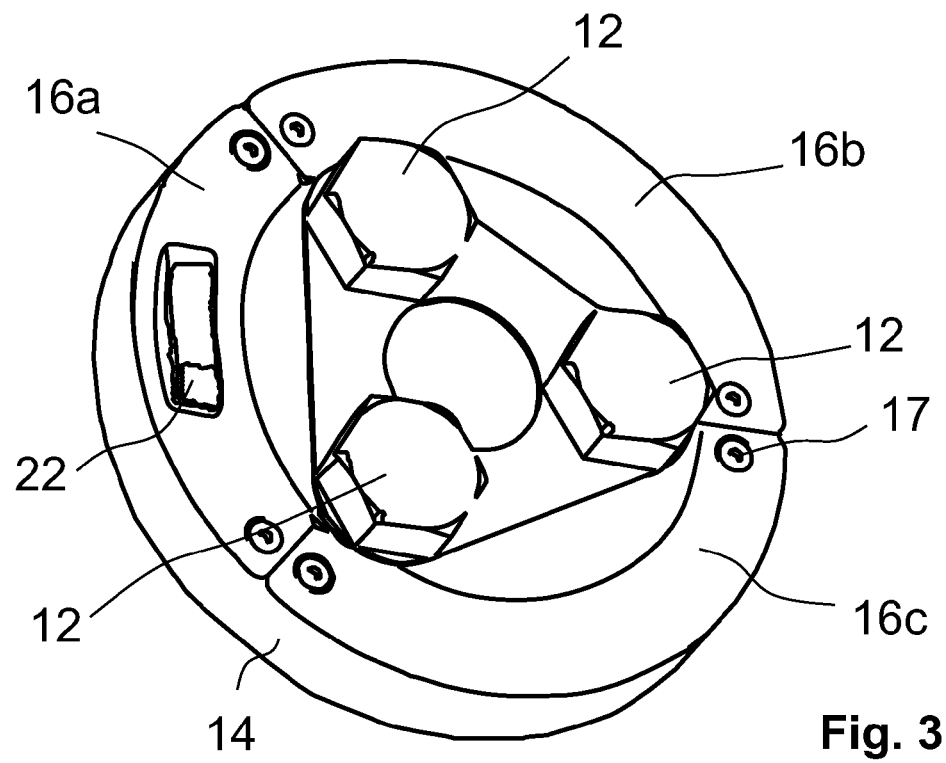
FIG. 3 shows an end cap of a hub unit according to the invention in an assembled state.

As illustrated in FIG. 3, the end cap 10 comprises a solid metal base part 14 and three arc-shaped cover plates 16a-16c fixed with two screws 17 respectively onto an axially outer side of the base portion 14 so as to surround the central portion with the bolts 12.

Figure 2:
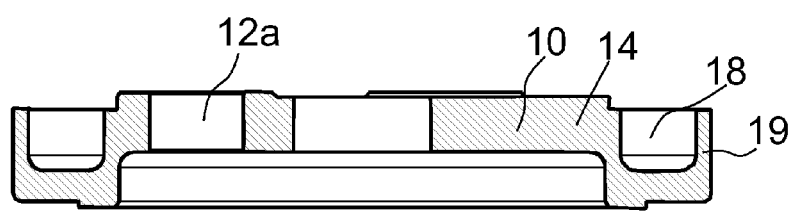
FIG. 2 is a sectional view of the end cap of FIG. 1.

The metal base part 14 is illustrated in a cross-sectional view in FIG. 2. An outer side of the metal base part 14, which faces away from the bearing unit 11 in the assembled configuration is provided with an annular, groove-like recess or pocket 18, which is symmetric with respect to a central hole of the end cap 10 and its base part 14. The annular, groove-like recess or pocket 18 is delimited by a metal wall 19 of essentially constant thickness on the radially outer side and by a solid bulk body of the base part 14 on the radially inner side.

Figure 4:
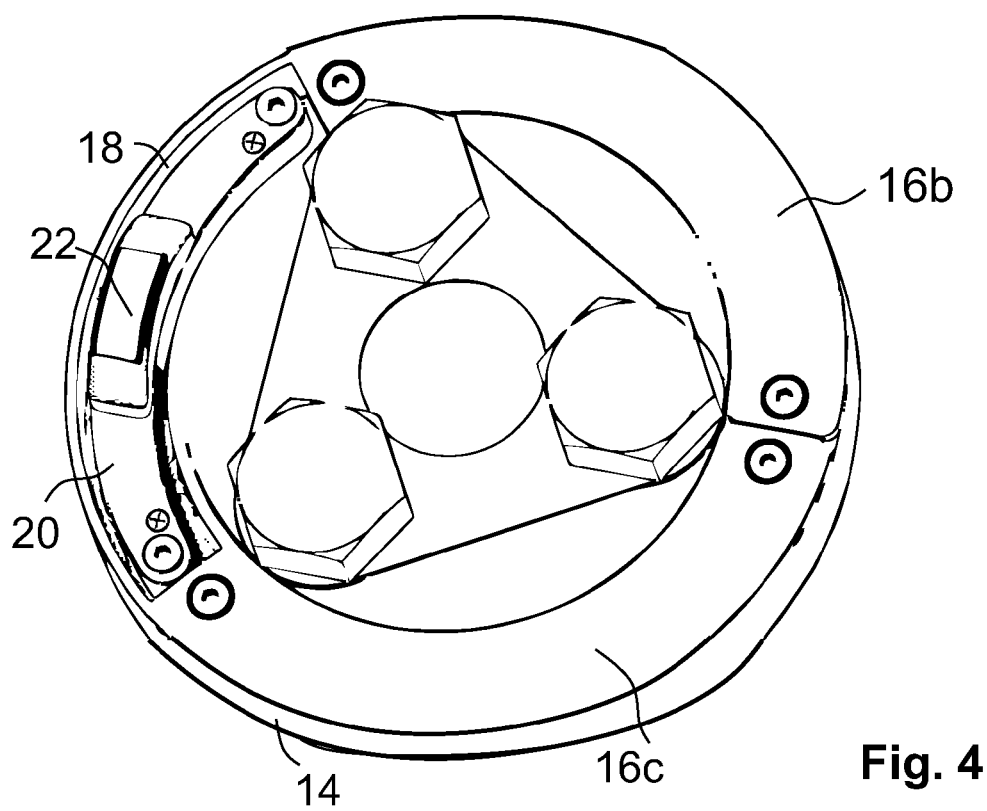
FIG. 4 shows the end cap of FIGS. 1 and 3 with a sensor unit and with one cover plate removed.

As illustrated in FIGS. 3 and 4, the cover plates 16a-16c cover the annular, groove-like recess or pocket 18 which is machined into the base portion 14 around its entire circumference concentrically to the rotational symmetry axis of the base portion 14. The base portion 14 has a threefold rotational symmetry, wherein only the holes 12a (FIGS. 1 and 2) for the bolts 12 and for the screws for fixing the cover plate 16a-16c break the complete rotational symmetry. As a consequence, the base portion 14 is very robust and sufficiently strong to support the required axial loads while having the required elastic properties and being at the same time easily machinable.

As illustrated in FIG. 4, the sensor unit 20 is arranged in the annular groove-like recess or pocket 18. The sensor unit 20 has a protruding antenna portion 22, which is part of a wireless transmitter 24 of the sensor unit 20 and the cover plate 16a covering the sensor unit 20 has a through-hole 26 (FIG. 3). In the assembled configuration as illustrated in FIG. 3, the antenna portion 22 is fitted through the through-hole 26 so as to protrude over the cover plate 16a.

Figure 5:
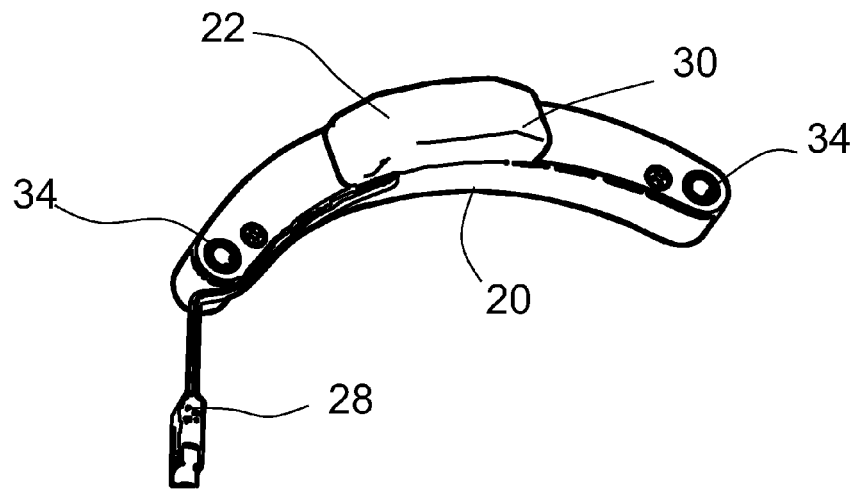
FIG. 5 shows the sensor unit of the hub unit according to FIGS. 3 and 4 separated from the hub unit.

FIG. 5 illustrates a configuration wherein the sensor unit 20 has been taken out of the annular, groove-like recess or pocket 18. The sensor unit 20 has a connector 28 for connecting the sensor unit 20 to a power supply, e.g. batteries or accumulators provided in the recess under the cover plates 16b and 16c.

A top plastic cover 30 of a housing 32 of the sensor unit 20 is made of a very robust plastic material such as PPS GF30. Rolled metal inserts 34 are fitted into holes at both ends of the housing 32. The inserts 34 receive the screws for fixing the cover plate 16a such that the sensor unit 20 is fixed with the same screws.

The top cover 30 is fixed on the housing by two further screws and an O-ring seal is provided between the top cover 30 and the rest of the housing 32. The bottom part of the housing 32 is equally made of the same robust plastic material as the top cover 30.

Figure 6:
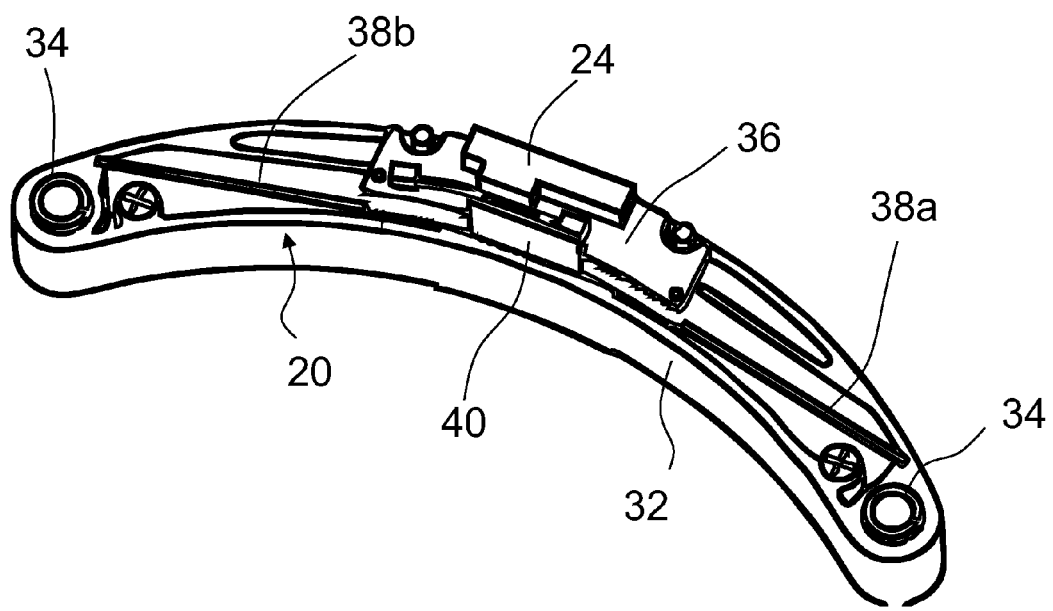
FIG. 6 shows the sensor unit of FIG. 5 with its top cover part removed.
Figure 8:
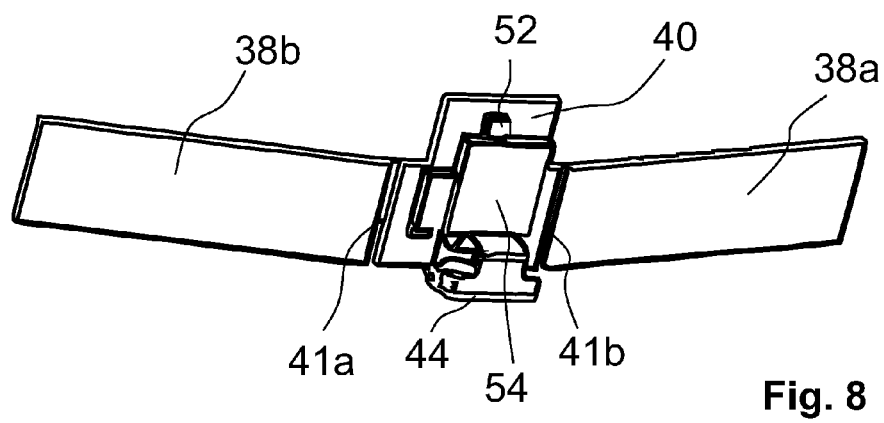
FIG. 8 shows the sensor assembly and the circuit boards of the sensor unit according to FIGS. 5-7 without a housing of the sensor unit.

FIG. 6 illustrates a configuration where the top cover 30 is removed. A base plate 36 supports the transmitter unit 24 and three parts of 38a, 38b, 40 of a circuit board are fitted into pertinent mounting slots in the housing 32 so as to be arranged parallel to an axial direction of the end cap 10, which corresponds to a rotation axis of the bearing 11. The circuit board 40 in the middle of the sensor unit 20 is arranged such that its wiring side faces radially outwards, i.e. towards the convex side of the housing 32, whereas the circuit boards 38a, 38b are arranged in the essentially opposite direction, i.e. such that their wiring sides face towards the concave side of the housing 32. As shown in FIG. 8, the circuit board 40 and the circuit boards 38a, 38b are connected to one another with flexible elements 41a, 41b so as to be pivotable. The entire circuit board configuration can therefore be easily fitted into the curved interior of the housing 32 while allowing for sufficient mounting space for the circuit elements despite of the curved shape of the housing 32.

Figure 7:
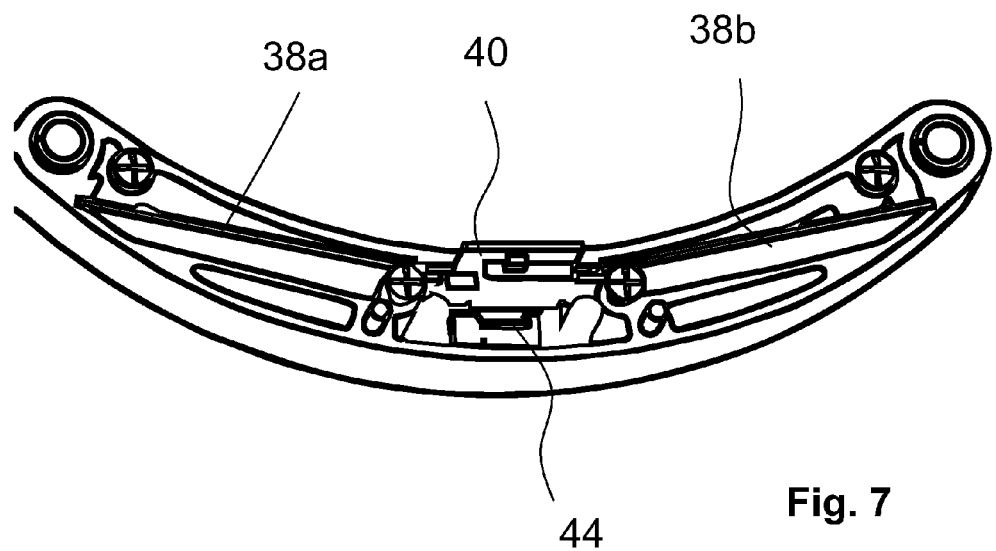
FIG. 7 shows the sensor unit of FIGS. 5 and 6, wherein a supporting plate carrying the transmitter unit is removed.

FIG. 7 shows a configuration where the base plate 36 with the transmitter 24 is removed. A bottom surface of the housing 32 is provided with a through-hole 42 (FIG. 9) receiving the sensor base plate 44 which is forced downwards by springs (not illustrated) thrusting to the backside of the base plate 36. The sensor base plate 44 carries vibration sensor and/or acoustic emission (AE) sensor 48 and a temperature sensor 50.

Figure 9:
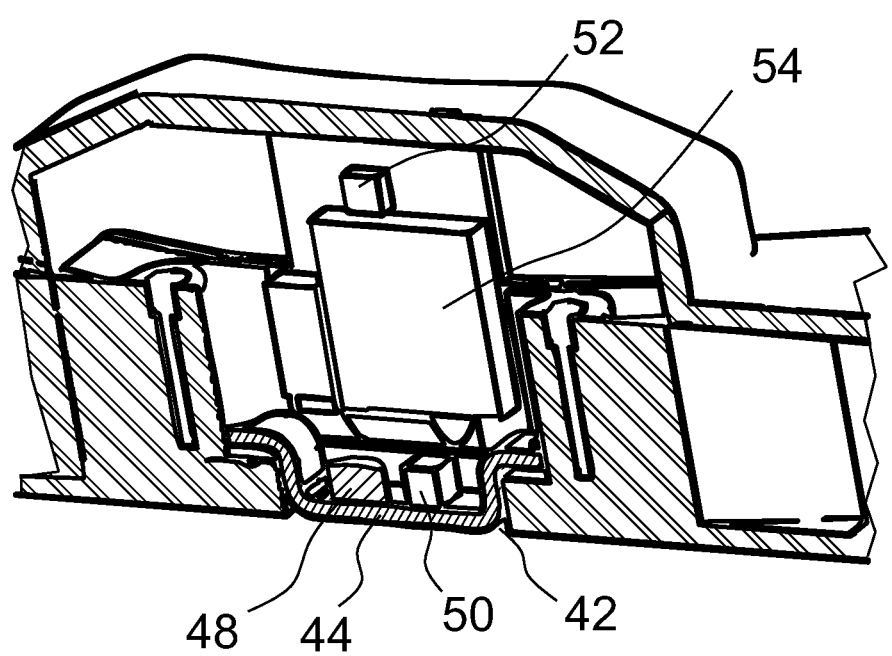
FIG. 9 shows a sectional view of the sensor unit according to FIGS. 4-8.

As illustrated in FIGS. 8 and 9, a gyro sensor 52 is mounted on the circuit board 40.

The sensor base plate 44 is pressed to the bottom surface of the annular, groove-like recess or pocket 18 in the base portion 14 of the end cap 10, which is very close to the inner ring of the bearing such that the temperature and the vibrations of the inner ring can be measured in a very reliable way.

Further, two extra crystals for the transmitter unit 24 are provided on the central circuit board 40.

The signals obtained by the sensors 48-52 are processed in a processing unit 54 on the circuit board 40 and transmitted in a wireless way by the transmitter 24 of the sensor unit 20. The signals are received and processed by a control unit (not illustrated) in the train, which compares the measured values with threshold values, which may be a function of the outside temperature or other outside parameters, and generates status information and/or warning signals in relation to the bearing unit 11.

The invention claimed is:

1. A hub unit including:
   an end cap for preloading and retaining a bearing unit on an axle,
   wherein the end cap is provided with a sensor unit for detecting at least one of vibrations and temperature of the bearing unit, the sensor unit having an arched shape formed in a radial direction of the end cap, the sensor unit being located proximate an annular edge of the end cap.

2. The hub unit according to claim 1, the sensor unit further comprising a wireless transmitter for sending the data acquired by the sensor unit.

3. The hub unit according to claim 2, further comprising a cover plate having a through hole,
   wherein at least an antenna portion of the transmitter unit protrudes through the through hole over the cover plate.

4. The hub unit according to claim 1, the end cap further comprising a pocket accommodating the sensor unit,
   wherein the pocket is covered by at least one cover plate.

5. The hub unit according to claim 4, wherein the pocket is formed as an annular recess arranged concentrically with respect a rotation axis of the bearing unit.

6. The hub unit according to claim 1, the sensor unit further comprising an overall arc-shaped sealed housing and with a circuit board arranged within the housing.

7. The hub unit according to claim 1, the sensor unit further comprising at least one acoustic emission sensor.

8. The hub unit according to claim 1, the sensor unit further comprising at least one gyro sensor.

9. A controller suitable for reading out data acquired by a sensor unit of a hub unit,
   the hub unit comprising:
      an end cap for preloading and retaining a bearing unit on an axle,
      wherein the end cap is provided with a sensor unit for detecting at least one of vibrations and temperature of the bearing unit, the sensor unit having an arched shape formed in a radial direction of the end cap, the sensor unit being located proximate an annular edge of the end cap,
   wherein the controller is configured to generate at least one of a status information and warning signals based on the detection results obtained from the sensor unit.

10. A hub unit including:
    an end cap for preloading and retaining a bearing unit on an axle; and
    a circuit board including multiple circuit board segments, the multiple circuit board segments being pivotably connected to one another by a flexible element,
    wherein the end cap is provided with a sensor unit for detecting at least one of vibrations and temperature of the bearing unit.

11. The hub unit according to claim 10, a wiring side of at least one of the multiple parts of the circuit board is oriented in a direction essentially opposite to a direction in which at least one neighboring part of the circuit board is oriented.

12. The hub unit according to claim 10, the sensor unit further comprising a wireless transmitter for sending the data acquired by the sensor unit.

13. The hub unit according to claim 12, further comprising a cover plate having a through hole,
    wherein at least an antenna portion of the transmitter unit protrudes through the through hole over the cover plate.

14. The hub unit according to claim 10, the end cap further comprising a pocket accommodating the sensor unit,
    wherein the pocket is covered by at least one cover plate.

15. The hub unit according to claim 14, wherein the pocket is formed as an annular recess arranged concentrically with respect a rotation axis of the bearing unit.

16. The hub unit according to claim 10, the sensor unit further comprising an overall arc-shaped sealed housing and with the circuit board arranged within the housing.

17. The hub unit according to claim 10, the sensor unit further comprising at least one acoustic emission sensor.

18. The hub unit according to claim 10, the sensor unit further comprising at least one gyro sensor.

* * * * *